United States Patent [19]
Tamaki et al.

[11] 3,891,100
[45] June 24, 1975

[54] STORAGE WITH AUTOMATIC HANDLING MEANS FOR STORING ARTICLES

[75] Inventors: Mituo Tamaki, Urawa; Yasumasa Ninomiya; Tatsuo Koyama, both of Tokyo; Ryouhei Ishige, Kashiwa, all of Japan

[73] Assignees: Hitachi, Ltd.; Japanese National Railways, Japan

[22] Filed: Oct. 12, 1973

[21] Appl. No.: 405,900

[30] Foreign Application Priority Data
Oct. 18, 1972  Japan.............................. 47-103569

[52] U.S. Cl............................. 214/38 CA; 214/16 B
[51] Int. Cl............................................ B65g 67/10
[58] Field of Search ................ 214/16 B, 38 CA, 40

[56] References Cited
UNITED STATES PATENTS
3,081,884  3/1963  Minty.............................. 214/38 CA
3,483,829  12/1969  Barry.............................. 214/38 CA Primary Examiner—Robert B. Reeves
Assistant Examiner—Thomas E. Kocovsky
Attorney, Agent, or Firm—Craig & Antonelli

[57]  ABSTRACT

In a yard in which article loading and unloading operation is carried out on a train of freight cars standing at random positions, a plurality of fixed points each corresponding to one of these freight cars are disposed along the track, and an article storing area consisting of a plurality of article storing spots is defined on the basis of these fixed points. In the yard, an automatic crane is disposed to straddle the track and the article storing area so that the crane can travel along the track for recognizing the position of the freight cars relative to the fixed points and carrying out article loading and unloading operation between the freight cars and the article storing area. By virtue of such an arrangement, automation of article handling operation can be achieved in the yard in spite of the fact that the freight cars are stopped at random positions.

5 Claims, 8 Drawing Figures

PATENTED JUN 24 1975 3,891,100

SHEET 3

STORAGE WITH AUTOMATIC HANDLING MEANS FOR STORING ARTICLES

This invention relates to a storage for storing articles, and more particularly to a storage of the kind in which unloading of desired articles from a train of freight cars standing at random positions in the storage and transfer of such articles to other specified places and vice versa can be fully automatically carried out without any manual control. Although the storage according to the present invention is in no way limited to a yard for handling containers, the present invention will be described with reference to a container yard by way of example for better understanding of the present invention.

In a container yard for handling containers loaded on freight cars, the containers are customarily handled by a container crane. However, no container cranes of the fully automatic type have been developed yet and fully automated container yards have not been proposed yet. This is attributable to the fact that freight cars carrying containers thereon cannot be exactly stopped at predetermined positions, since the freight cars are coupled to each other by a coupler. More precisely, due to the fact that freight cars are coupled to each other by a coupler which has a certain degree of freedom in the running direction of the freight cars, the stopped position of each individual freight car is not constant and differs from time to time even when the driver of the freight car train attempts to position exactly the front end of the freight car tractor at a fixed point.

Such an inconvenience may be eliminated at handling of containers without any manual control may be achieved by providing a fixed address for each of freight cars. However, this method is not practical due to the fact that detector means must be provided on all the freight cars. Generally, operation in a container yard includes not only unloading of containers from freight cars but also loading of containers on freight cars from the container storing area. Thus, even if the detector means could be provided on all of the individual freight cars, this method is defective in that the desired interrelation cannot be maintained between the containers in the container storing area and the addressed freight cars on the track in the container yard. Inasmuch as the prior art method involves such defect, it is no exaggeration to conclude that full automation of loading and unloading operation in a yard (storage) handling freight has not been achieved yet.

It is therefore a primary object of the present invention to provide a storage for storing articles in which desired articles can be fully automatically handled without any manual control.

In accordance with the present invention, there is provided a storage for storing articles comprising a track for a freight car unit consisting of a plurality of freight cars each carrying articles spaced from each other by a predetermined distance, a plurality of fixed points disposed on the ground along said track and spaced from each other by a predetermined distance so that each fixed point corresponds to each individual freight car, an article storing area consisting of a plurality of article-storing spots disposed along said track and positioned relative to said fixed points, and an automatic crane unit adapted for travelling along said track for detecting relative displacement of said fixed points and the corresponding ones of said freight cars, recognizing the position of said freight cars relative to said fixed points and carrying out loading and unloading of desired articles between said freight cars and said article storing area.

Other objects, features and advantages of the present invention will be apparent from the following detailed description taken in conjunction with the accompanying drawings, in which.

In the accompanying drawings, the same reference numerals are used to denote the same parts.

Figure 1:
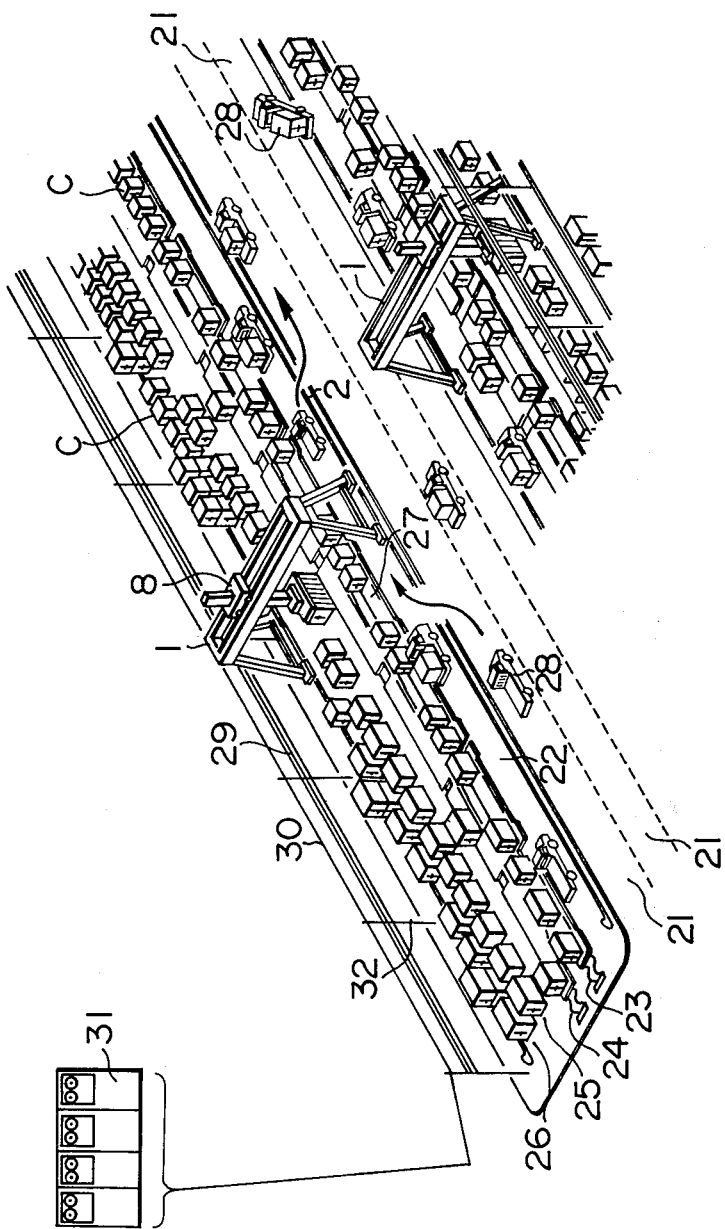
FIG. 1 is a birds'-eye view of a part of a container yard according to the present invention.

Referring to FIG. 1 showing a part of a container yard according to the present invention in birds'-eye view, a plurality of gantry type automated cranes 1 (hereinafter referred to as automatic cranes) are arranged to travel on crane rails 2 laid on the ground of the yard, and container conveying trucks 28 run on runways 21 provided exclusively for the trucks 28. Another runway 22 is provided within the span of each automatic crane 1 so that the container conveying trucks 28 can enter this runway 22 to receive the loading and unloading service by the automatic crane 1. A first and a second track 23 and 24 are laid within the span of the automatic crane 1 for the railway transportation of containers C, and a first and a second container storing areas 25 and 26 are disposed along the tracks 23 and 24. The containers C are carried by trains 27 of freight cars used exclusively for the railway transportation of the containers C. Trolley wires 29 supply electrical power to the automatic crane 1, and an antenna 30 is provided so that automatic loading and unloading instruction signals can be transmitted from a computer 31 installed in a yard control building or the like to the automatic crane 1 and return signals from the automatic crane 1 can be transmitted to the computer 31. The trolley wires 29 and antenna 30 are supported by pillars 32. It will be seen from the general arrangement shown in FIG. 1 that the container yard includes a plurality of sets of lanes which are disposed on opposite sides of the truck runways 21, and each set of lanes is disposed within the span of the automatic crane 1.

Figure 2:
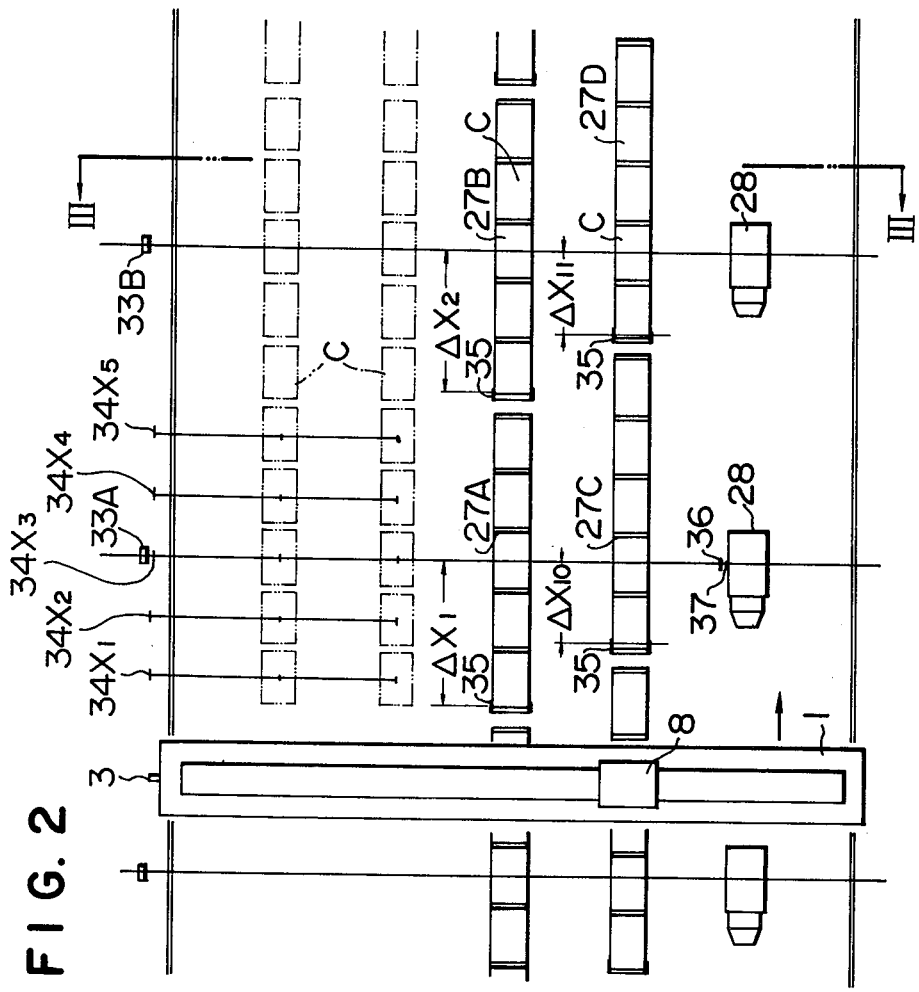
FIG. 2 is a plan view of a part of the storage according to the present invention.
Figure 3:
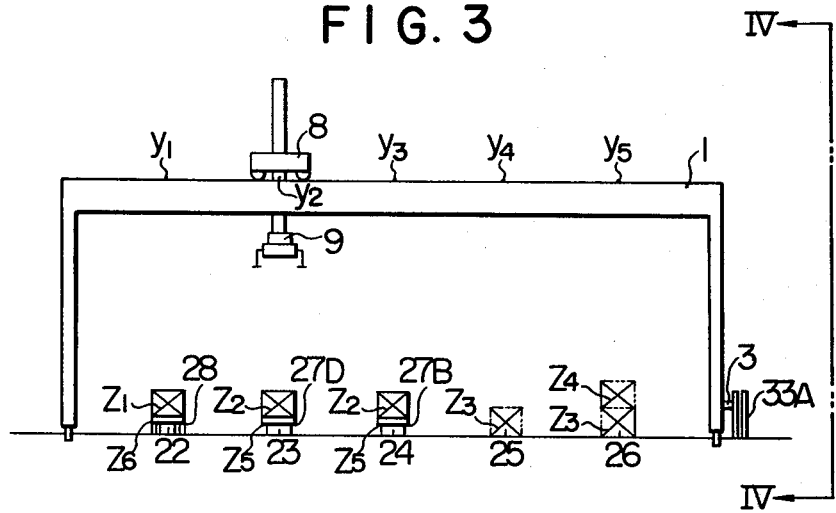
FIG. 3 is an elevation of the storage when viewed along the line III—III in FIG. 2.
Figure 4:
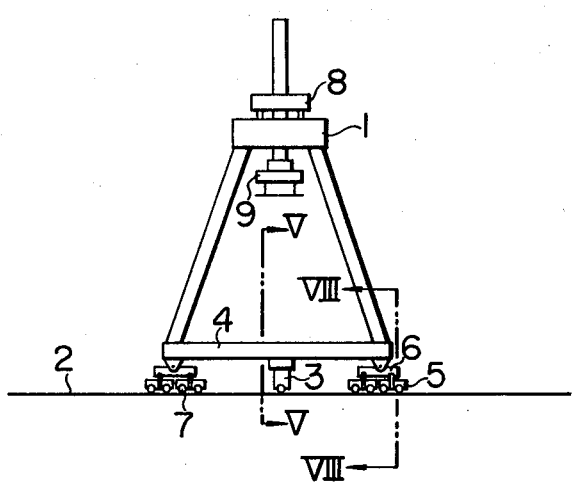
FIG. 4 is an elevation when viewed along the line IV–IV in FIG. 3.

The relation between detecting means mounted on the automatic crane 1, detected elements disposed on the ground, and different detected elements mounted on the freight cars will be described with reference to FIGS. 2 to 4. Referring to FIG. 4, a detector device 3 is mounted to the central portion of the leg-connecting beam 4 of the automatic crane 1, and the truck portions 5 of the automatic crane 1 are supported by arms 6 and are provided with rail-engaging wheels 7. Referring to FIG. 2, detected units 33A and 33B are disposed on the ground along the tracks 23 and 24 and are spaced from each other by a predetermined distance corresponding substantially to the center-to-center distance of coupled freight cars 27A and 27B (27C and 27D) so that they occupy positions opposite to the respective freight cars. In other words, these detected units 33A and 33B are disposed at fixed points for detecting the position of these freight cars in a manner as will be described later.

Figure 7:
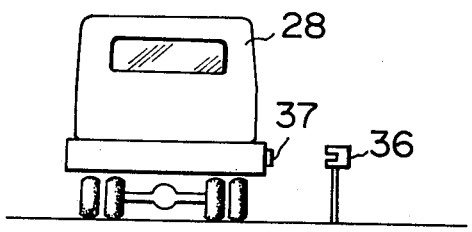
FIG. 7 shows the relation between a detector and a detected element for stopping a truck at a fixed point.

A plurality of spaced detected elements $34X_1$ to $34X_5$ are disposed on the ground and are suitably, positioned relative to the detected unit 33A. Similar detected elements are associated with the detected unit 33B although not shown in FIG. 2. As seen in FIG. 2, these detected elements $34X_1$ to $34X_5$ register with the center of the corresponding containers C placed on the container storing spots in the container storing areas 25 and 26. Thus, the positions of the container storing spots in the container storing areas 25 and 26 are determined relative to the detected elements $34X_1$ to $34X_5$. These detected elements $34X_1$ to $34X_5$ have a function which will be described later. A detected element 35 is mounted at one end of each of the freight cars 27A to 27D so that the position of each freight car can be detected. Detector 36 are disposed on the ground for stopping trucks 28 at positions corresponding to the fixed points, and a detected element 37 is mounted on the frame of each truck 28 as shown in FIG. 7 so that the truck position can be detected when the element 37 is opposed by the detector 36. These detected elements 35 and 37 have substantially the same function as the detected elements $34X_1$ to $34X_5$.

Figure 5:
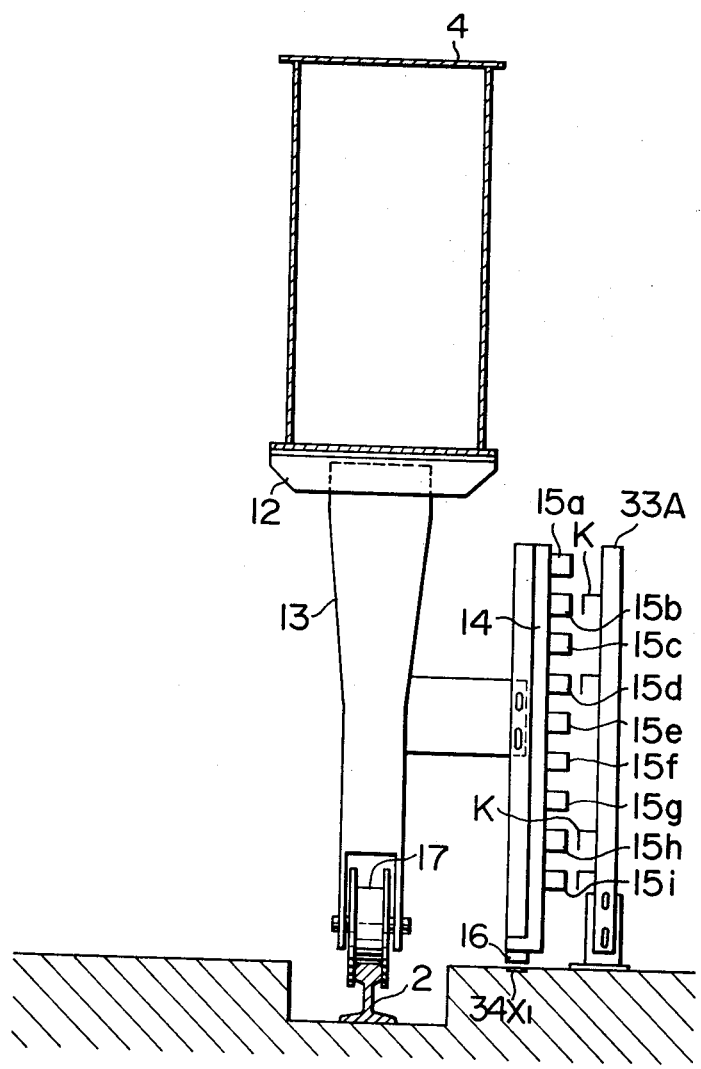
FIG. 5 is an enlarged detail view when viewed along the line V—V in FIG. 4.

FIG. 5 shows in detail the structure of the detector device 3 mounted to the automatic crane 1 and the detected unit 33A disposed on the ground. The detector device 3 comprises a detector supporting member 13 supported by a member 12 fixed to the central portion of the leg-connecting beam 4 of the automatic crane 1, a seat 14 of non-magnetic material fixed to this supporting member 13, a longitudinal series of detector elements $15a$ to $15i$ mounted on the seat 14 for detecting the detected units 33A and 33B disposed on the ground, and another detector element 16 mounted on the side of the seat 14 opposite to the ground for detecting the detected elements $34X_1$ to $34X_5$ disposed on the ground. The supporting member 13 is provided at the lower end thereof with a wheel 17 which makes rolling movement on the rail 2.

The detected units 33A and 33B disposed on the ground are provided with a plurality of detected elements K on the side opposite to the detector elements $15a$ to $15i$ to be detected by the latter. The arrangement of these detected elements K in the detected unit 33A differs from that in the detected unit 33B. For example, in the case of the detected unit 33B, these elements K are disposed at positions opposite to the detector elements $15a$, $15c$, $15e$ and $15f$.

Figure 6:
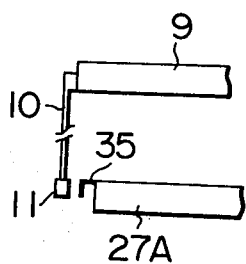
FIG. 6 shows the relation between a detector mounted on the spreader of the automatic crane and a detected element fixed to a freight car.

The detected element 35 fixed to each freight car is detected by a detector device 11 supported by a mounting member 10 extending from a container grasping spreader 9 supported by the crab 8 of the automatic crane 1 as shown in FIG. 6. A crane having a spreader provided with such a detector device has been described in detail in the copending Japanese Pat. Application Nos. 31653/72 and 31654/72 filed on Mar. 31, 1972 and assigned to the assignees of the present invention.

Figure 8:
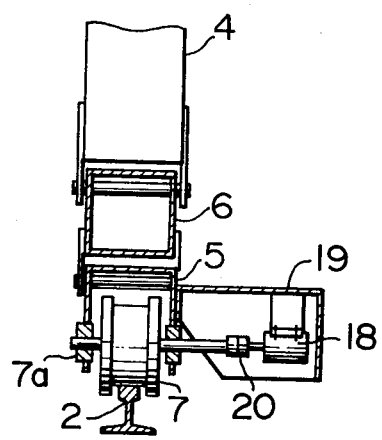
FIG. 8 is an enlarged section taken on the line VII—VIII in FIG. 4.

As shown in FIG. 8, a pulse generator 18 is secured to a holding member 19 extending from the truck portion 5 of the automatic crane 1 and the end of the rotary shaft thereof is connected to the axle of the wheel 7 by a coupling 20. The wheel axle is journaled in bearings 7a.

Container handling operation in the storage of the present invention having an arrangement as above mentioned will now be described with reference to FIG. 2.

Suppose, for example, that a freight car unit consisting of a plurality of freight cars 27A, 27B, . . . each carrying a plurality of containers arranged in predetermined spaced relation enters the container yard and is at rest on the second track 24 in such a relation that the detected element 35 of the first freight car 27A is spaced by a distance of $\Delta \chi_1$ from the detected unit (fixed point) 33A. As is commonly known, the freight cars 27A and 27B are coupled to each other by a coupler and the center-to-center distance of the freight cars 27A and 27B coupled by the coupler is variable within a certain range. Therefore, the distance $\Delta \chi_2$ between the detected element 35 of the freight car 27B and the detected unit (fixed point) 33B is not equal to $\Delta_1 \chi$. Similarly, $\Delta \chi_{10}$ and $\Delta \chi_{11}$ are also not equal to each other in the case of freight cars 27C and 27D on the first track 23.

In handling a desired container among those carried by one of the freight cars in, for example, the freight car unit on the first track 23, the positions of the freight cars in the freight car unit relative to the detected units 33A and 33B on the ground are first detected. To this end, the crab 8 of the automatic crane 1 is moved to the position above the first track 23 on which the freight car unit is at rest. The position of the moving crab 8 is detected by successive elements $y_1$ to $y_5$ disposed on the crane girder as shown in FIG. 3, and in this case, the crab 8 is automatically stopped at the position $y_2$ corresponding to the first track 23. After the crab 8 has been stopped at the position $y_2$, the spreader 9 is lowered from the crab 8 until the detector device 11 is opposed by the detected element 35 on the freight car as shown in FIG. 6. The spreader 9 can be automatically stopped at the desired position by previously determining the vertical positions $z_1$ to $z_6$ of the containers, trucks and freight cars relative to the points $y_1$ to $y_5$ as shown in FIG. 3 since the containers, trucks and freight cars have specific fixed positions in the vertical direction. After lowering of the spreader 9 in this manner, the automatic crane 1 starts to travel in the direction shown by the arrow to detect initially the detected element 35 of the freight car 27C. In response to the detection of the detected element 35, the pulse generator 18 shown in FIG. 8 is energized to generate a pulse signal. The pulses are counted until the detected unit (fixed point) 33A on the ground is detected to find the distance $\Delta \chi_{10}$. As soon as the distance $\Delta \chi_{10}$ is found, the counter for the pulses generated by the pulse generator 18 is reset and the distance $\Delta \chi_{10}$ is stored in the memory of the computer 31 which controls the automatic crane 1. The automatic crane 1 continues to travel in the direction of the arrow, and as soon as the detected element 35 of the freight car 27D is detected, the counter starts to count the pulses generated by the pulse generator 18 to find the distance $\Delta \chi_{11}$ between the detected element 35 of the freight car 27D and the detected unit (fixed point) 33B on the ground. This distance $\Delta \chi_{11}$ is similarly stored in the computer 31. In this manner, the distance between each of the freight cars in the freight car unit and the associated fixed point on the ground that can be found. Thus, all the distances $\Delta\chi$ between the fixed points on the ground and the elements of the freight cars are stored in the memory of the computer 31 and the automatic crane 1 can be brought to the position directly above the center of any desired container C on any desired freight car. These containers C are placed on the freight cars in equally spaced apart relation as described previously.

The positions of the container C stored in the container storing areas 25 and 26 are determined relative to the detected elements $34X_1$ to $34X_5$ which are disposed on the ground in such a relation that they are associated with the detected units 33A and 33B. Thus, when it is desired to transfer one of the containers C carried by, for example, the freight car 27B to a desired storing spot on the ground, the detected unit (fixed point) 33A on the ground is detected by the detector elements 15 and then the corresponding detected element 34X is detected by the detector element 16 so that the automatic crane 1 can be guided to the specific storing spot instructed by the computer 31.

The detecting elements or detectors 36 for stopping the trucks 28 at predetermined positions are disposed on the ground with the same spacing as that of the detected units (fixed points) 33A and 33B. The detector 36 detects the detected element 37 attached to the frame of the truck 28 and generates a signal energizing a buzzer or the like so as to inform the truck driver of the fact that the truck 28 has reached the fixed point. Thus, the truck 28 can be accurately stopped at the fixed point.

It will be understood from the foregoing description that, according to the present invention, detected units representative of fixed points for individual freight cars in a train are disposed on the ground along the travelling direction of an automatic crane in the same number as the number of the freight cars. Thus, the present invention can achieve automation of a yard in which freight cars are stopped at rendom positions.

What we claim is:

1. A storage for storing articles comprising track for a freight car unit consisting of a plurality of freight cars each carrying articles spaced from each other by a predetermined distance, each of said freight cars having a detected element, a plurality of fixed points disposed on the ground along said track and spaced from each other by a predetermined distance so that each fixed point corresponds to an individual freight car, an article storing area consisting of a plurality of article storing spots disposed along said track and positioned relative to said fixed points, means for detecting relative displacement of said fixed points and the standing position of the corresponding ones of said freight cars, said detecting means including means for recognizing each said detected element, means for temporarily memorizing the displacement, and an automatic crane means for carrying out loading and unloading of desired articles between said freight cars and said article storing area according to instructions from said memorizing means.

2. A storage as claimed in claim 1, wherein said automatic crane means is of the gantry type, and a plurality of said tracks and a plurality of parallel rows of said article storing areas are disposed within the span of said crane.

3. A fully automated storage for storing horizontally placed articles comprising a plurality of tracks for a plurality of freight car units each consisting of a plurality of freight cars each carrying articles spaced from each other by a predetermined distance, each of said freight cars having a detected element, a plurality of fixed points disposed on the ground along said tracks and spaced from each other by a predetermined distance so that each fixed point corresponds to each individual freight car, a plurality of parallel rows of articles storing areas each consisting of a plurality of article storing spots disposed along said tracks and positioned relative to said fixed points, means for stopping trucks servicing loading and unloading operation at points corresponding to said fixed points, a truck passage disposed along said tracks, means for detecting relative displacement of said fixed points and the standing position of the corresponding ones of said freight cars, said detecting means having means for recognizing each said detected element, means for temporarily memorizing the displacement, and an automatic crane means disposed to straddle said tracks, said article storing areas and said truck passage for carrying out loading and unloading of desired articles between said freight cars, said article storing areas and the trucks on said truck passage according to instructions from said memorizing means.

4. A storage comprising a pair of unit storages as claimed in claim 3, wherein said unit storages are disposed so that said truck passage in one of said unit storages is opposite to said truck passage in the other said unit storage, and an exclusive runway for trucks is disposed between said truck passages in said unit storages.

5. A storage as claimed in claim 4, wherein plurality of said exclusive runways are provided.

* * * * *